United States Patent [19]
Zajac

[11] 3,807,049
[45] Apr. 30, 1974

[54] QUICK PRE-SET MULTIPLE PURPOSE MEASURING TOOL

[76] Inventor: David A. Zajac, 9388 Los Coches, Lakeside, Calif. 92040

[22] Filed: Mar. 16, 1972

[21] Appl. No.: 235,348

[52] U.S. Cl. ............................ 33/165, 33/164 D
[51] Int. Cl. ..................... G01b 5/00, G01b 3/18
[58] Field of Search ............... 33/164 D, 165, 167; 248/407, 408; 287/58 CT

[56] References Cited
UNITED STATES PATENTS

| | | | |
|---|---|---|---|
| 1,098,515 | 6/1914 | Marion | 33/165 |
| 1,943,638 | 1/1934 | Swanson | 33/165 |
| 1,656,927 | 1/1928 | Wheelock | 33/165 |
| 2,777,692 | 1/1957 | Marzucco | 248/408 |
| 2,421,440 | 6/1947 | Thorpe | 33/165 |
| 2,611,967 | 9/1952 | Bennett | 33/165 |
| 1,883,975 | 10/1932 | Kutyniak | 33/165 |
| 3,170,242 | 2/1965 | Deittrick | 33/165 |
| 817,492 | 4/1906 | Layman | 33/165 |
| 3,535,793 | 10/1970 | Williams | 33/165 |
| 3,114,976 | 12/1963 | Rantsch | 33/165 |
| 1,853,134 | 4/1932 | Mischker | 33/165 |
| 2,841,876 | 7/1958 | Pittenger | 33/165 |
| 1,949,280 | 2/1934 | Lester | 33/165 |
| 3,113,384 | 12/1963 | Keszler | 33/165 |

Primary Examiner—John W. Huckert
Assistant Examiner—Jon W. Henry
Attorney, Agent, or Firm—Roy L. Knox

[57] ABSTRACT

A measuring tool characterized by a cylindrical standard equippped with accurately spaced pins in a straight line along its length and a slide or traverse shiftable along the standard and releasably securable selectively on the pins for quick approximate adjustment relative to the item to be measured, the traverse carrying a micrometer for fine measurement. Spring detent means are incorporated with the traverse and pins for releasably holding the traverse in manually adjusted position. As a caliper the traverse has an anvil slidably mounted thereon and gently spring biased toward the micrometer, which latter has the barrel thereof fixed on the traverse and the spindle engaging the anvil so that as before an additive reading can be obtained. The item is conceived as having utility as a micrometer gage, height gage, inside or outside caliper or accessory for a machine tool.

2 Claims, 9 Drawing Figures

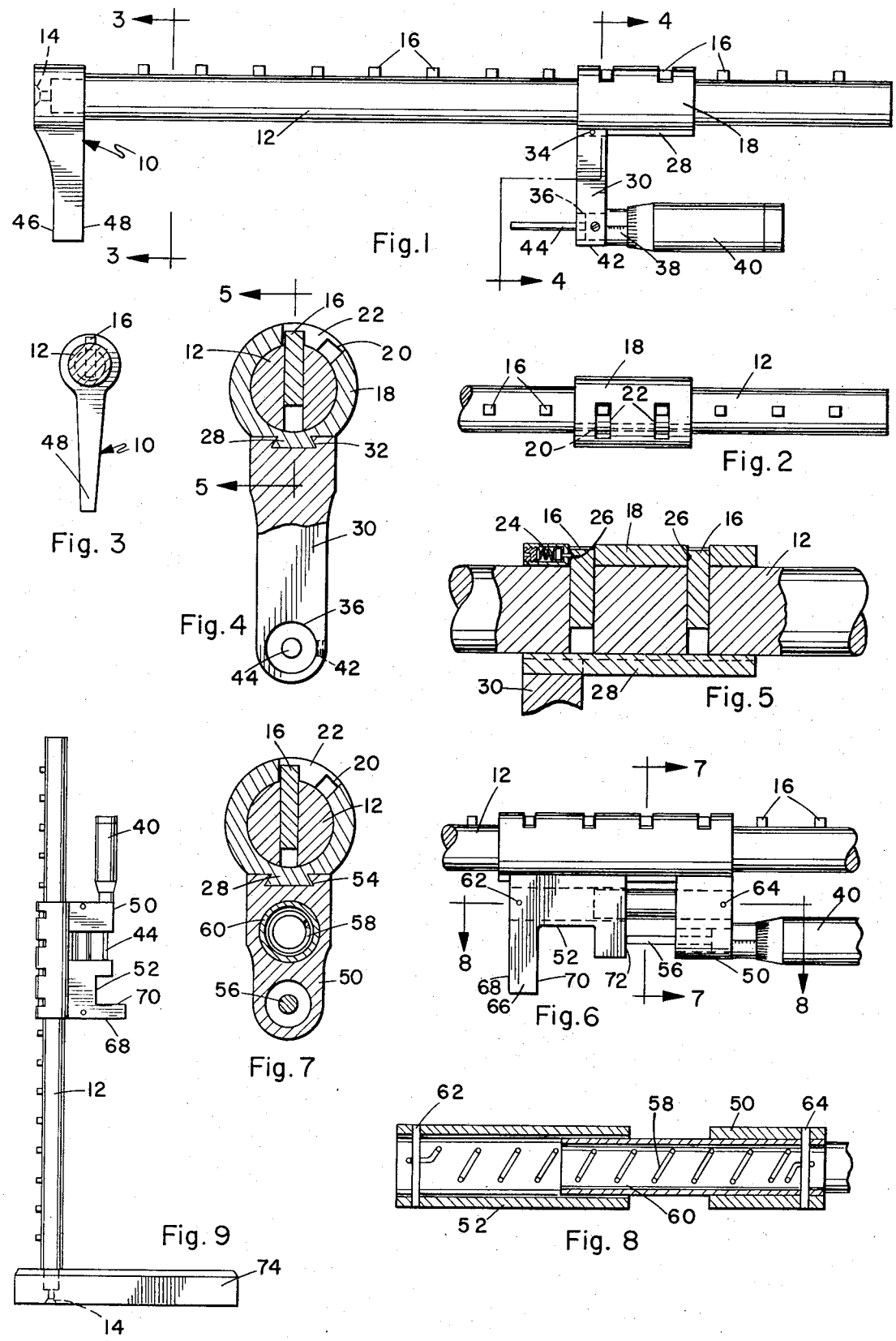

QUICK PRE-SET MULTIPLE PURPOSE MEASURING TOOL

BACKGROUND OF THE INVENTION

The relative prior art is extensive and varied, including hand and bench tools and machine tool accessories, height gages, dial indicators and caliper squares. Prior quick set tools of this general type may have scale elements separate from the standard and the standard may be provided with spaced notches to receive holding means for a slider somewhat analogous to the "traverse" described by applicant and it is known to be old to mount a micrometer on such a slider or traverse. There exists a need, however, for a really practical tool of this character with a minimal number of parts and accuracy of adjustment without thumbscrews and the like or parts subject to maladjustment.

SUMMARY OF THE INVENTION

As claimed, this measuring tool supplies the above mentioned need and is characterized by a single, plain recti-cylindrical beam or standard with a series of accurately spaced pins in a straight row on one side of the standard engaged preferably two or more at a time by a tubular traverse snugly and slidably mounted on the standard and having a slot to accomodate said pins, with accurately positioned and dimensioned notches for selective acceptance of the pins when the traverse is rotated a few degrees from its free sliding position. The pins are equipped with spring detents and the transverse carries a micrometer. As a caliper square the base element assumes the form of a jaw and the traverse is equipped with a sliding, spring pressed, anvil which follows the micrometer spindle.

BRIEF DESCRIPTION OF THE DRAWING

FIG. 1 is a side elevation view of one form of the tool;

FIG. 2 is a top plan view of a portion of the tool;

FIG. 3 is a sectional view taken on line 3—3 of FIG. 1;

FIG. 4 is an enlarged sectional view taken on line 4—4 of FIG. 1;

FIG. 5 is a sectional view taken on line 5—5 of FIG. 4;

FIG. 6 is a side elevation view of a modified portion of the tool;

FIG. 7 is an enlarged sectional view taken on line 7—7 of FIG. 6;

FIG. 8 is an enlarged sectional view taken on line 8—8 of FIG. 6; and

FIG. 9 is a side elevation view of the tool assembled for use as a height gage.

DETAILED DESCRIPTION OF A PREFERRED EMBODIMENT

As illustrated in the drawing, the tool has a base reference member 10 and a meter bar or standard 12, the latter being recti-cylindrical and terminally inserted into the reference member and removably secured thereto by a screw 14 or the like. The standard has a row of identical pins 16 accurately and equally spaced therealong and a tubular traverse generally indicated by the numeral 18 is snugly and slidably mounted on the standard, the traverse having a longitudinal channel or slot 20 to accomodate the pins 16 when the traverse is slid along the standard.

At one side of the longitudinal slot 20, the traverse 18 has a pair of spaced transversely extending notches 22 dimensioned for snug reception of a pair of adjacent pins 16 when the traverse 18 is rotated a few degrees in the quick pre-setting step in this use of this tool. For releasably holding the traverse in this manually adjusted quick-set position the traverse is equipped with a spring detent 24, each pin having at one side thereof a socket 26 to accept the pin of the spring detent 24, as best illustrated in FIG. 5.

The traverse 18 has a dove-tailed shaped rail 28 on the side thereof remote from said notches 22 and a radial arm 30 has a correspondingly shaped channel 32 so that the radial arm can be snugly fitted onto the traverse as indicated in FIG. 1 retaining the radial arm on the traverse. The distal end of the radial arm is provided with a bore 36 for the barrel 38 of a micrometer 40 held in place by a set screw 42. The spindle 44 of the micrometer is of course extended toward the reference member 10.

When the pins are spaced one inch apart, center to center, reading the quick pre-set component of the measurement is facilitated by having the work-engaging surfaces 46, 48 of the reference member one-half or another simple fraction of an inch apart. The radial arm and the placement thereof on the traverse will also be such the the zero reading of the micrometer will correspond to an obvious quick pre-set reading obtained by counting the pins between the traverse and the reference member 10, or a reading of a visual scale which may be applied to the standard 12, so that an additive reading can be obtained including the fine micrometric reading.

The micrometer can be mounted on a radial arm 50, similar to the radial arm 30 but shown as shorter and integrated with or fixed to the transverse as indicated in FIGS. 6–9. A sliding anvil 52 has a dove-tail channel 54 and is made easily slidable manually or under the pressure of the spindle as indicated at 56. The sliding anvil is biased to move toward the micrometer by a spring 58 coiled within a telescopic tubular spring case 60 terminally secured to the radial arm by a pin 64, and pins 62 and 64 serve to anchor the ends of the spring to the anvil and radial arm.

The anvil 52 has a projecting portion 66 with two work-engaging surfaces 68 and 70 which, as well as the spindle-engaged surface 72, are critically spaced for easy reading of the measurements obtained. For example, the portion 66 may be one-quarter of one inch in effective thickness and the spacing of the surfaces 70 and 72 may be three-quarters of one inch. As before explained the zero reading of the micrometer will correspond with an obvious quick-set reading.

When the tool is used with the anvil 52, inside measurements can be made by using the surfaces 70 and 46, as well as the outside caliper measurements made by using the surfaces 68 and 48. Measurements can also be made between one interior surface and the exterior surface of the opposite wall of a pipe using the surfaces 48 and 70 as the work-engaging surfaces.

Finally, the reference member 10, which is removable, can be replaced by a heavier base reference member using the same screw 14, and the tool is then ideally suited for use as a height gage. Use as a caliper has already been inferentially explained and it is conceived also that the tool can be secured to a machine tool such as a mill and the like for varied measurements.

Minor variation may be resorted to within the ambit of the appended claims and the illustrated form and description of the invention is proposed as illustrative rather than limiting.

I claim:

1. A quick pre-set multiple purpose measuring tool comprising:

a base reference member having a pair of spaced, oppositely directed parallel surfaces;

an elongated cylindrical standard terminally secured to said base reference member normally to said spaced surface;

pins fixed to and extending radially from said cylindrical standard in a straight row longitudinally of this standard and accurately spaced;

a generally tubular traverse slidably mounted on said standard and having a slot to accomodate said pins as the traverse is adjusted longitudinally on the standard, said slot having a transversely extending notch to accept any selected one of said pins and retain said traverse in accurately spaced relation relative to said base reference member;

a spring-biased detent mounted in said traverse and protruding into said notch, each of said pins having a concavity to register with said detent when the respective one of said pins is engaged in said notch;

said traverse having a radial arm and a micrometer mounted thereon for fine measurement relative to said base reference member;

whereby quick pre-setting can be made by rotating the traverse to align said slot with the pins, sliding the traverse longitudinally of the standard to the position which is the appropriate distance from the base member to permit measurement by said micrometer within the working range thereof, and then using the micrometer for fine measurement.

2. A tool according to claim 1 wherein said base reference member is in the form of a jaw and said traverse has an anvil slidably mounted thereon and adjustable longitudinally of the standard by said micrometer, means biasing said anvil against said micrometer, the oppositely directed surfaces of said base reference member being work-engaging surfaces, and said anvil has spaced oppositely directed work-engaging surfaces and a micrometer spindle-engaged surface, the spacing between any two of said surfaces when said notch is engaged on one of said pins being one of several fractional multiples, including improper fractional multiples, of the distance separating the centers of adjacent pins, whereby both inside and outside caliper measurements can be conveniently made.

* * * * *